US012769274B1

(12) United States Patent
Hyde

(10) Patent No.: US 12,769,274 B1
(45) Date of Patent: Oct. 20, 2026

(54) SYSTEMS AND METHODS FOR REAL-TIME MONITORING AND VERIFICATION OF PROCEDURES FOR START UP OR SHUT DOWN OF INDUSTRIAL MACHINERY

(71) Applicant: Realtime Applications, Inc., Birmingham, AL (US)

(72) Inventor: John Hyde, Birmingham, AL (US)

(73) Assignee: Realtime Applications, Inc., Birmingham, AL (US)

( * ) Notice: Subject to any disclaimer, the term of this patent is extended or adjusted under 35 U.S.C. 154(b) by 289 days.

(21) Appl. No.: 18/623,526

(22) Filed: Apr. 1, 2024

Related U.S. Application Data

(60) Provisional application No. 63/493,302, filed on Mar. 30, 2023.

(51) Int. Cl.
*G05B 19/048* (2006.01)
*G05B 19/418* (2006.01)
*G05D 7/06* (2006.01)

(52) U.S. Cl.
CPC ......... *G05B 19/048* (2013.01); *G05B 19/418* (2013.01); *G05D 7/0623* (2013.01)

(58) Field of Classification Search
CPC ... G05B 19/048; G05B 19/418; G05D 7/0623
See application file for complete search history.

(56) References Cited

U.S. PATENT DOCUMENTS 7,970,871 B2 6/2011 Ewing et al.
9,374,874 B1 6/2016 Ewing
9,466,965 B2 10/2016 Lehtola et al.
10,541,092 B2 1/2020 Oneufer et al.
10,915,084 B2 * 2/2021 Wienhold .......... G05B 19/0425
11,041,779 B1 6/2021 Bagwell et al.
11,678,296 B1 6/2023 Luterman
11,955,780 B2 4/2024 Kroushl et al.
12,562,008 B1 * 2/2026 Jefferies .................. G07C 1/32
2012/0235515 A1 * 9/2012 Scharnick ................ H02J 4/00 307/328
2014/0282257 A1 * 9/2014 Nixon .................... G05B 11/01 715/835
2018/0253920 A1 * 9/2018 Kalous .................... E05B 65/48
2019/0392186 A1 * 12/2019 Swartz .................. G06Q 10/20
2022/0268475 A1 8/2022 Barnes
2023/0095055 A1 * 3/2023 Yamamoto ......... G05B 19/4063 700/80

* cited by examiner

*Primary Examiner* — Rami R Okasha
(74) *Attorney, Agent, or Firm* — Butler Snow, LLP; Jon E. Holland

(57) ABSTRACT

A mobile monitoring device is used to facilitate a process of shutting down or restarting industrial machinery (e.g., motor-driven equipment) in a safe and reliable manner. The monitoring device is configured to monitor states of control devices that control operation of the machinery. The monitoring device is configured to display instructions indicating steps that are to be performed as part of the process of shutting down or restarting the machinery. As the user performs the steps, the monitoring device is configured to use feedback from the user and/or information from sensors attached to the control devices to verify that the user is performing the steps in a correct sequence. If the monitoring device detects an anomaly in the process of shutting down or restarting the machinery, then the monitoring device is configured to take at least one action to mitigate the anomaly.

20 Claims, 5 Drawing Sheets

SYSTEMS AND METHODS FOR REAL-TIME MONITORING AND VERIFICATION OF PROCEDURES FOR START UP OR SHUT DOWN OF INDUSTRIAL MACHINERY

CROSS REFERENCE TO RELATED APPLICATION

This application claims priority to U.S. Provisional Patent Application No. 63/493,302, entitled "Systems and Methods for Low Energy Wireless Real-Time Monitoring and Verification of MCC (Motor Control Center) Buckets in conjunction with a LTV (Lockout/Tagout/Verify) Software Application or Platform," and filed on Mar. 30, 2023, which is incorporated herein by reference.

RELATED ART

Industrial machinery, such as motor-driven equipment at manufacturing facilities or other industrial settings, often utilize high power and/or moving components that can be dangerous to persons in the vicinity of the machinery. Such machinery is often electrically connected to controllers, sometimes referred to as "buckets," at a motor control center (MCC) that may be located a safe distance from the machinery. Often the MCC buckets for some or all the machinery at a site are located at a central location, sometimes referred to as an "MCC room."

An MCC bucket connected to a given machine often includes various circuitry, such as transformers, circuit breakers, switches, etc., that provides electrical power to the machine. The bucket may cutoff power to the machine in response to unexpectedly high currents and also may provide an emergency shutdown function that allows a user to manually cutoff power to the machine. When appropriate, a user may provide inputs to the bucket (e.g., actuate a handle of a switch) to allow electrical power to flow to the machine as a part of a startup procedure.

When maintenance is to be performed on a machine, it is often desirable for a sequence of steps for a shutdown procedure to be performed in order to ensure that the machine is properly shutdown or otherwise put into a state that is safe for the work to be performed. Such steps may include manipulation of control devices, such as valves or switches, on or connected to the machine, as well as manipulation of one or more control devices of the bucket connected to the machine. As an example, the bucket may have a lever switch that should be thrown or otherwise manipulated in order to ensure that electrical power is prevented from flowing to the machine. If the steps are not followed in the proper order or if steps are omitted, then damage to the machine could occur and/or the machine could be placed into a state resulting in a hazardous condition that could be particularly dangerous for personnel working in the vicinity of or performing maintenance on the machine. Similarly, when the machine is to be restarted after performance of a maintenance operation, then steps according to a particular startup procedure should be performed to ensure that the machines restarts safely and without damage.

A given shutdown or startup procedure can be complicated requiring several steps and the manipulation of many control devices. It can be relatively easy for a user to omit a step or perform the steps out of the desired sequence. Users often follow checklists when implementing these procedures in an effort to minimize errors, but errors nevertheless occur resulting in dangerous conditions and/or damage to the equipment. Improved techniques for shutting down and restarting industrial machinery, such as motor-driven equipment, are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for real-time monitoring and verification of procedures for controlling industrial machinery. In some embodiments, a mobile monitoring device is used to facilitate a process of shutting down or restarting machinery (e.g., motor-driven equipment) in a safe and reliable manner. The monitoring device is configured to monitor states of control devices that control operation of the machinery. The monitoring device is configured to display instructions indicating steps that are to be performed as part of the process of shutting down or restarting the machinery. As the user performs the steps, the monitoring device is configured to use feedback from the user and/or information from sensors attached to the control devices to verify that the user is performing the steps in a correct sequence. If the monitoring device detects an anomaly in the process of shutting down or restarting the machinery, then the monitoring device is configured to take at least one action to mitigate the anomaly. As an example, the monitoring device may display a message or otherwise trigger an alarm to warn one or more users of the anomaly, and the monitoring device may be configured to instruct one or more control devices to perform an action to mitigate the anomaly. For example, the monitoring device May instruct a switch to transition to a state for preventing electrical power from flowing to the machinery. Yet other actions in response to the detected anomaly are possible in other examples.

Figure 1:
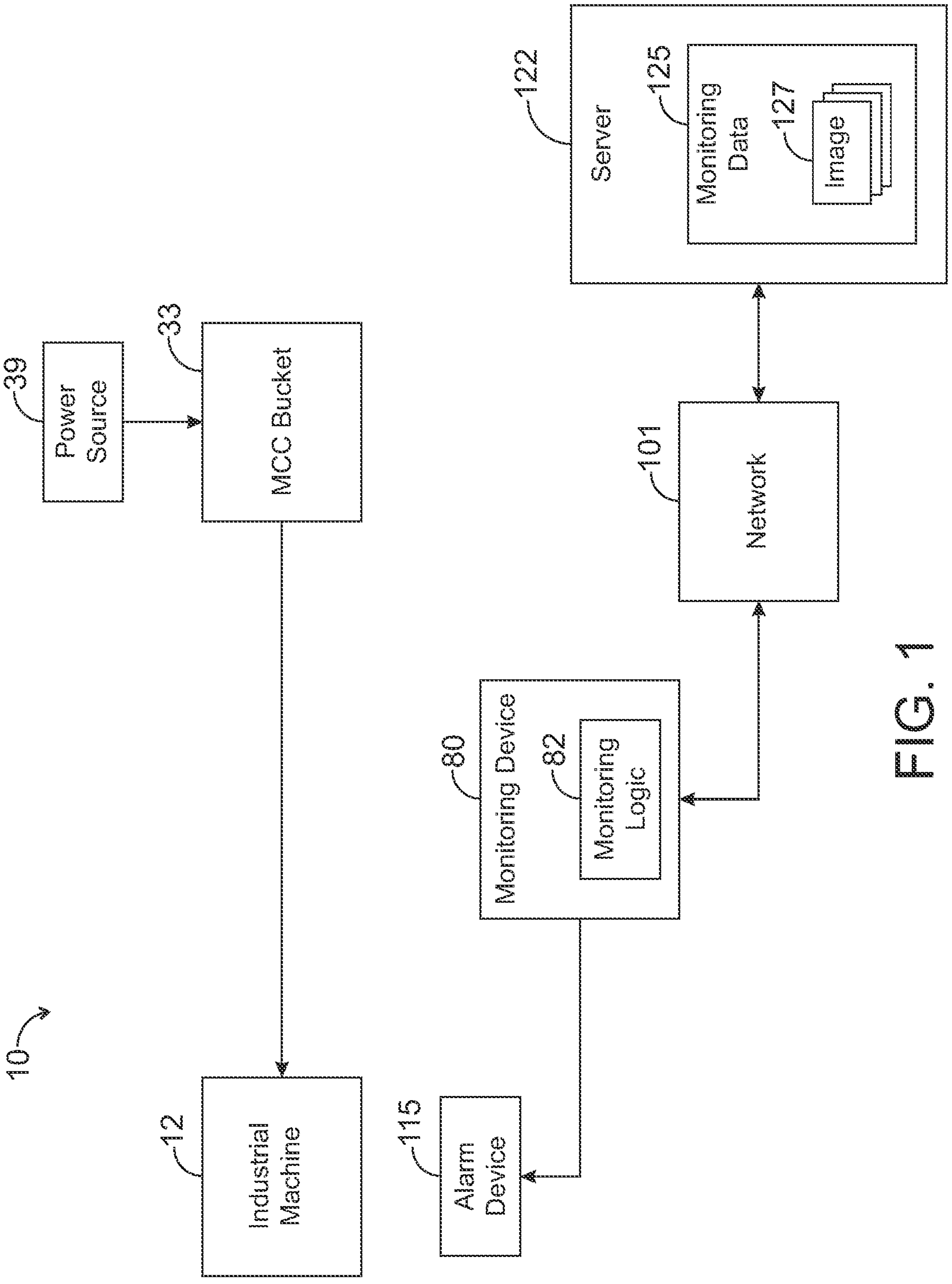
FIG. 1 is a block diagram illustrating an embodiment of a system for monitoring and controlling industrial machinery.
Figure 2:
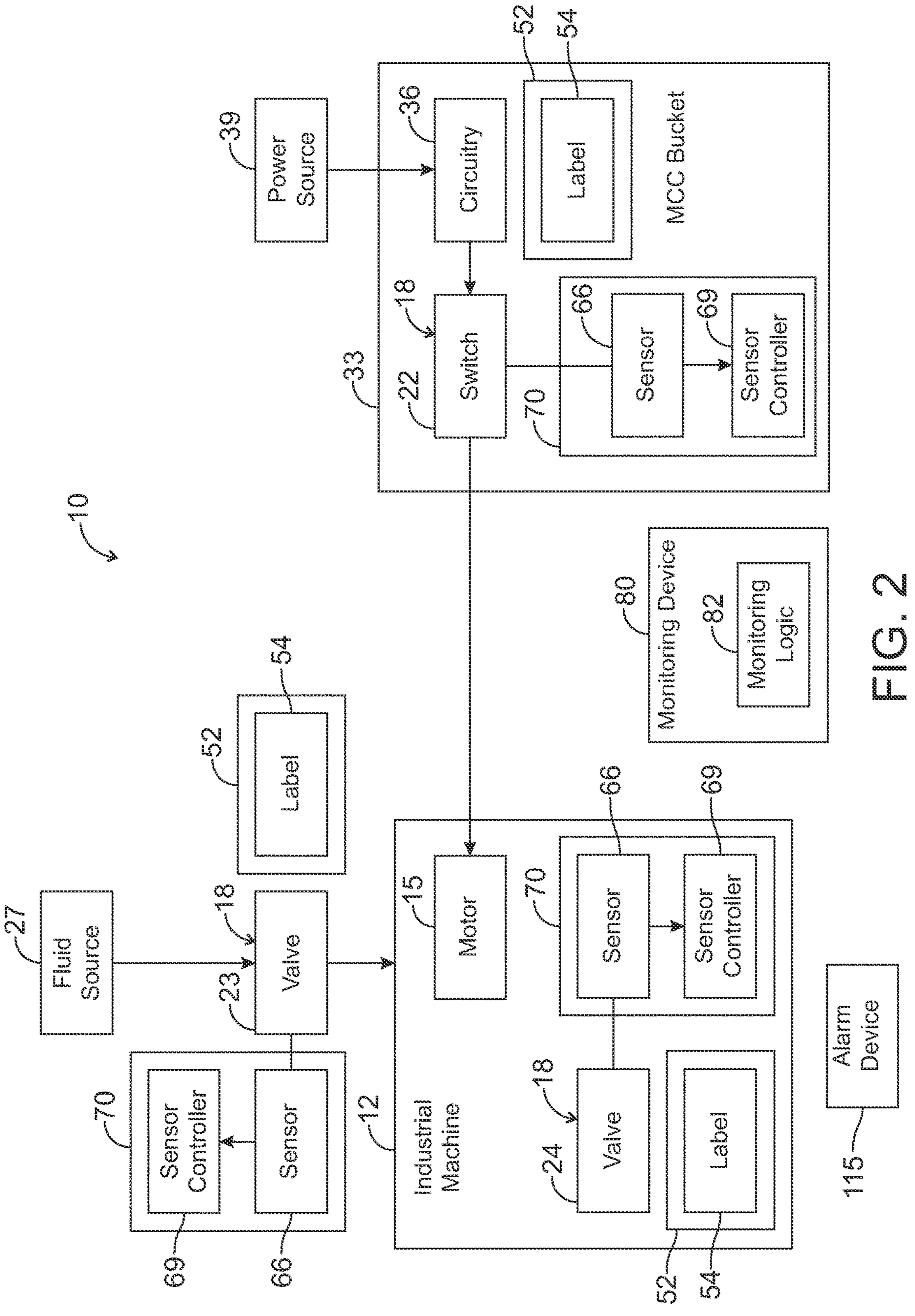
FIG. 2 is a block diagram illustrating details of an industrial machine and MCC bucket depicted by FIG. 1.

FIG. 1 depicts a system 10 for monitoring and controlling industrial machinery. As shown by FIG. 1, the system 10 has an industrial machine 12, such as motor-driven equipment for use in an industrial setting (e.g., a manufacturing facility or industrial plant). The exemplary machine 12 of FIG. 1 has a motor 15 (FIG. 2) for use in operation, but use of a motor 15 is unnecessary in other embodiments. As shown by FIG. 2, one or more control devices 18 may be used to control the operation of the machine 12, as will be described in more detail below. Such control devices 18 may include switches 22 (e.g., relays), valves 23, 24 and other devices that are used to control flows of fluids or electrical current to the machine 12 including, in particular, the motor 15. Such control devices 18 may be manually actuated in order to control the flow of a fluid or current.

For example, as shown by FIG. 2, a valve 23 may be connected between a fluid source 27 that forces a fluid, such as a liquid (e.g., fuel or water) or air, through the valve 23 to the machine 12 (e.g., motor 15) when the valve 23 is open. A user may manually close the valve 23 to stop the flow of the fluid and then later manually open the valve 23 to again allow the fluid to flow. As shown by FIG. 2, a valve 24 (or other type of control device 18, such as switch) may form part of the machine 12 and similarly control a flow of a fluid or current. Such valve 24 may be manually actuated by a user to transition the valve 24 from an opened state to a closed state.

At least one control device 18 (e.g., a switch 22) is implemented by a controller 33 that is electrically connected to the machine 12. For example, the controller 33 may have circuitry 36 that is configured to receive and process a power signal from an external power source 39, such as an electrical grid. The circuitry 36 may include transformers, circuit breakers, voltage or current regulators, or other types of devices used to process power signals. A processed power signal is then transmitted from the circuitry 36 through the switch 22 to the motor 15 and/or other components of the machine 12 when the switch 22 is in the closed state. The switch 22 may be manually actuated by a user to transition it to an opened state such that the switch 22 prevents the power signal from flowing therethrough and reaching the machine 12. Later, the switch 22 may be manually actuated again to transition it to the closed state at which point the switch 22 allows the power signal to flow to the machine 12.

In some embodiments, the controller 33 has an encasing 41 (FIG. 3) that houses the circuitry 36 and on which one or more control devices 18, such as the switch 22 may be mounted. Such encasing 41 allows the controller 33 to be easily transported, installed and removed. Such a controller 33 with its encasing 41 is sometimes referred to as a "bucket." Hereafter, the controller 33 will be referred to as a "bucket," but it should be emphasized that the controller 33, in other embodiments, does not need an encasing or need to be implemented as a "bucket" as that term is known by persons of ordinary skill in the art.

Figure 3:
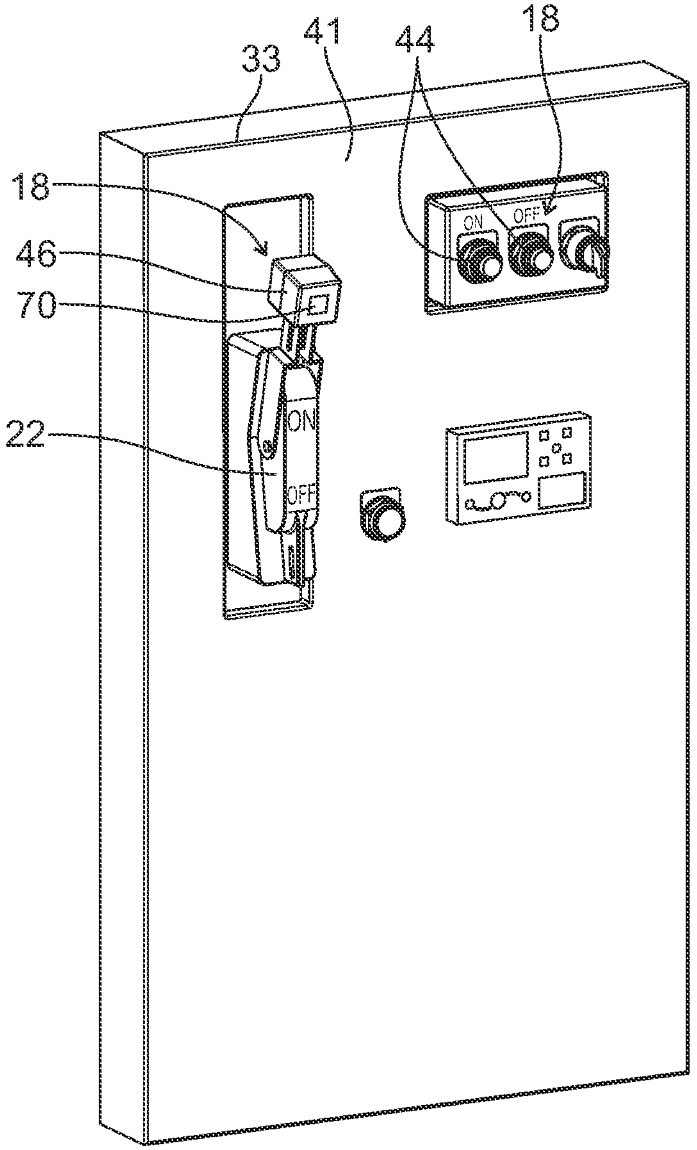
FIG. 3 is a diagram illustrating a front view of an MCC bucket, such as is depicted by FIG. 1.
Figure 4:
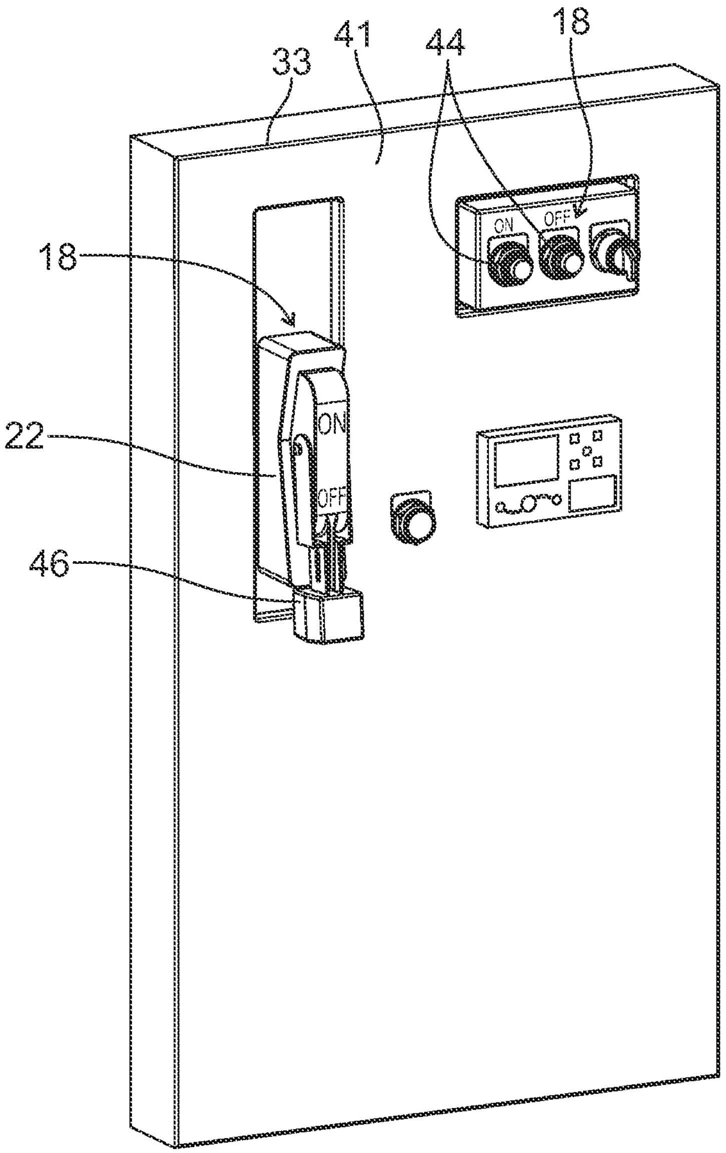
FIG. 4 is a diagram illustrating the MCC bucket of FIG. 2 after a handle of a lever switch has been moved to a different position.

In some embodiments, the switch 22 may be implemented as a lever switch having a lever or handle 46 that is movable (e.g., rotatable) between at least a first position (referred to herein as an "closed" position), as shown by FIG. 3, and a second position (referred to herein as a "opened" position), as shown by FIG. 4. To transition the switch 22 to an opened state whereby current is prevented from flowing through the switch 22 to the machine 12, the handle 46 may be moved (e.g., rotated) to the opened position shown by FIG. 4, and to transition the switch 22 to the closed state whereby the switch 22 allows current to flow to the machine 12, the handle 46 may be moved (e.g., rotated) to the closed position shown by FIG. 3.

Additionally, the bucket 33 may have other types of control devices 18, such as buttons 44 for receiving inputs from users to control operation of the machine 12. As an example, one of the buttons 44, may be an emergency shutoff button, which may be pressed or otherwise actuated to stop operation of the machine 12. Another of the buttons 44 may be a restart button, which may be pressed or otherwise actuated to restart operation of the machine 12 when the switch 22 is in the closed state. Yet other types of control devices 18 may be used in other embodiments.

As shown by FIG. 2, each control device 18 may be associated with a device identifier 52 that may be used to identify the control device 18. In some embodiments, the device identifier 52 is implemented as a label 54 on which information that may be used to identify the control device 18 is printed. As an example, the device identifier 52 may comprise a label 54 on which a unique serial number is printed that can be read to identify the control device 18. Such label 54 may be positioned close to or on the control device 18 such that the location of the label 54 in close proximity to the control device 18 indicates its association with that device 18. In some embodiments, a bar code or QR code may be printed on the label 54 to facilitate reading of the information on the label 54 by an electronic device, such as a mobile monitoring device 80, as will be described in more detail below.

In other embodiments, the device identifier 52 may be stored in a communication device (not specifically shown) that may be configured to transmit the device identifier 52 to the monitoring device 80 or other device. As an example, the device identifier 52 may be wirelessly transmitted using RFID, NFC, Bluetooth, or other short-range protocol.

Each control device 18 may also be associated with a respective sensor 66 that is configured to sense a parameter indicative of a state of the control device 18. Such sensor 66 may be mounted on or otherwise connected to the control device 18 or located sufficiently close to the control device 18 so that it can detect the parameter indicative of the state of the control device 18. As an example, for the switch 22 of the bucket 33 shown by FIG. 2, such switch 22 may have a movable handle 46 (FIG. 3), and a sensor package 70 having a sensor 66 may be mounted on or otherwise coupled to the handle 46. Such sensor 66 may sense an orientation or movement of the handle 46 so that a determination can be made regarding the state or position of the handle 46, such as whether the handle 46 is in the opened position or the closed position.

In some embodiments, the sensor 66 mounted on the handle 46 may be implemented as a tilt sensor that senses the orientation of the handle 46 or an accelerometer or other type of sensor that senses movement of the handle 46. In some embodiments, a valve 23, 24 may have a handle or other type of component that is moved (e.g., flipped or rotated) to open or close the valve 23, 24. A sensor 66 (e.g., a tilt sensor or accelerometer) may be similarly configured to sense an orientation or movement of the handle (or other moving component of the valve 23, 24) so that a determination can be made whether the valve 23, 24 is in an opened state or a closed state. In other embodiments, other types of sensors 66 may be used.

As shown by FIG. 2, each sensor 66 may be coupled to a sensor controller 69 that is configured to receive and process sensor data from the sensor 66. In some embodiments, each sensor controller 69 may comprise a battery-powered microprocessor (not specifically shown) or other type of processor that is configured to analyze the sensor data to determine when a change of state has occurred. As an example, a sensor controller 69 coupled to a sensor 66 for monitoring a valve 23, 24 may be configured to analyze the sensor data from the sensor 66 to determine when the valve 23, 24 is transitioned to an opened state or a closed state. Similarly, a sensor controller 69 coupled to a sensor 66 for monitoring the switch 22 may be configured to analyze the sensor data from the sensor 66 to determine when the switch 22 is transitioned to an opened state or a closed state. In other embodiments, other configurations of the sensor controller 69 are possible. For example, the sensor controller 69 may be implemented as a field programmable gate array (FPGA) or other type of device for performing the functions ascribed to it herein.

In some embodiments, a sensor 66 and the sensor controller 69 are packaged together in a package 70, referred to hereafter as "sensor package," to facilitate installation. As an example, a sensor package 70 may be glued or taped to the handle 46 as shown by FIG. 3, other portion of a control device 18, or another object. In other embodiments, other techniques and devices, such as hook and loop fasteners (e.g., Velcro), clips, bolts, or screws, may be used to secure a sensor package 70 to a control device 18 or another object. For example, a package 70 may be positioned within a pouch of a sleeve that is wrapped around the handle 46 or through which the handle 46 is inserted.

Each sensor controller 69 may have a communication interface (not specifically shown) for communicating with devices external to the sensor controller 69. As an example, the communication interface may communicate wirelessly using Bluetooth or other short-range communication protocol. In some embodiments, the communication interface uses Bluetooth Low Energy (BLE or Bluetooth LE), which is a variation of the Bluetooth wireless standard designed for low power consumption. BLE was introduced by the Bluetooth Special Interest Group (Bluetooth SIG) in December 2009, as part of the Bluetooth 4.0 specification. In other embodiments, other communication protocols may be used, such as near field communication (NFC) or 900 Mega-Hertz (MHZ). Information indicative of the states sensed by the sensor 66 or other information, such as the device identifier 52 associated with the control device 18 being monitored by the sensor 66, may be transmitted from the sensor controller 69, as will be described in more detail below.

Figure 5:
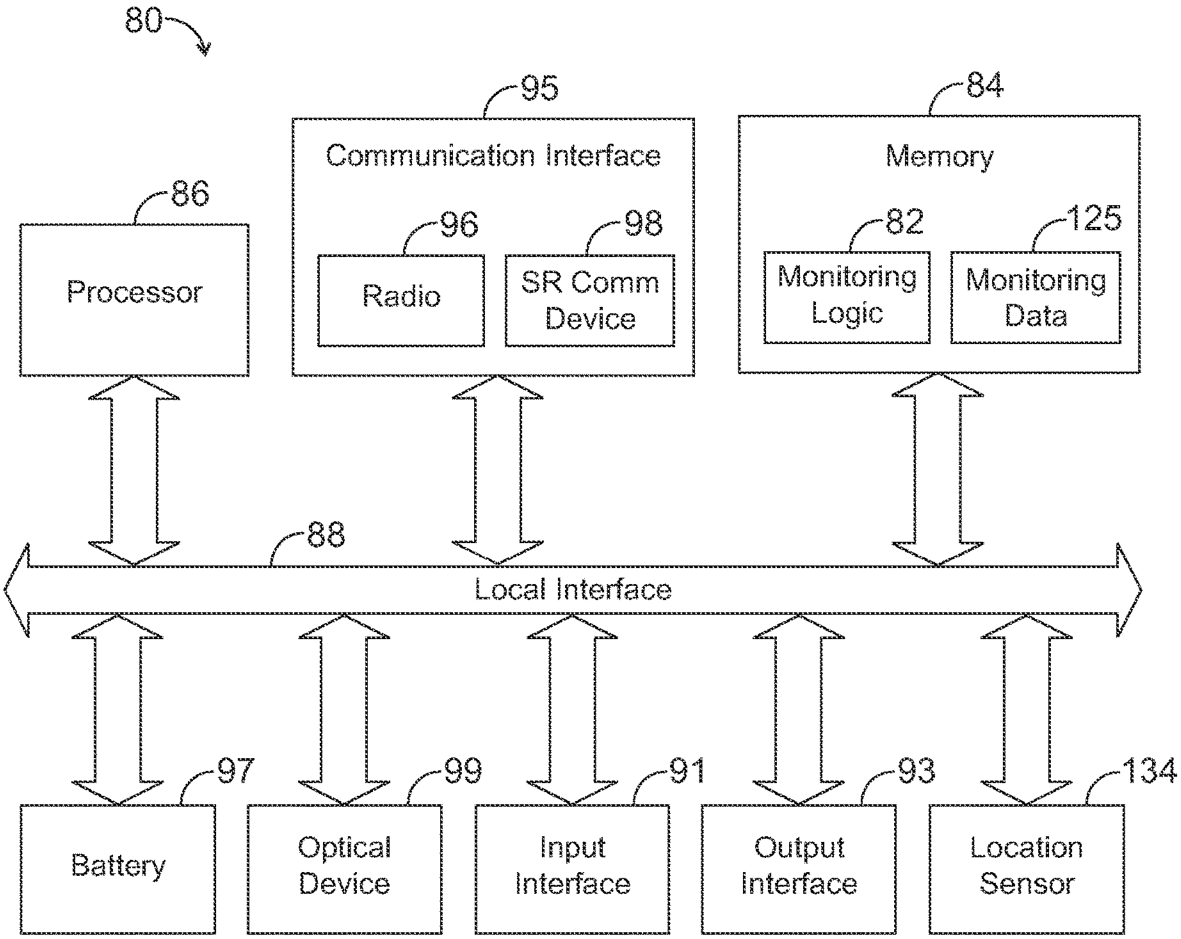
FIG. 5 is a block diagram illustrating an embodiment of a mobile monitoring device, such as is depicted by FIG. 1.

As shown by FIG. 1, a mobile monitoring device 80 may be used to facilitate procedures for shutting down or restarting the machine 12. In some embodiments, the mobile monitoring device 80 is implemented as a cellular telephone (e.g., a smartphone), but other types of mobile communication devices (e.g., iPads, personal digital assistants (PDAs), laptop or handheld computers, etc.) may be used. FIG. 5 depicts an exemplary embodiment of the mobile monitoring device 80. As shown by FIG. 4, the monitoring device 80 comprises monitoring logic 82 for generally controlling the operation of the device 80, as will be described in more detail hereafter. The monitoring logic 82 can be implemented in software, hardware, firmware or any combination thereof. In the exemplary monitoring device 80 illustrated by FIG. 5, the monitoring logic 82 is implemented in software and stored in memory 84 of the monitoring device 80.

Note that the monitoring logic 82, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary monitoring device 80 depicted by FIG. 5 comprises at least one conventional processor 86, such as a digital signal processor (DSP) or a central processing unit (CPU), that communicates to and drives the other elements within the device 80 via a local interface 88, which can include at least one bus. Furthermore, an input interface 91, for example, a keypad, keyboard or a mouse, can be used to input data from a user of the monitoring device 80, and an output interface 93, for example, a printer, monitor, liquid crystal display (LCD), or other display apparatus, can be used to output data to the user. In some embodiments, the input interface 91 and the output interface 93 may be integrated or otherwise share resources. As an example, the input interface 91 and the output interface 93 may be implemented as a touchscreen that is configured to display images and receive user input via capacitive sensing of touches of the touchscreen.

Further, a communication interface 95, such as at least one cellular or Wi-Fi radio 96, may be used to communicate with external devices. For example, the monitoring device 80 may be configured to use the communication interface 95 to communicate with a network 101 (FIG. 1), which may comprise a cellular network, a local area network (LAN), a wide area network (WAN), such as the Internet, and/or other types of networks known in the art. In some embodiments, the communication interface 95 may comprise a short-range communication device 98, such as a Bluetooth transceiver, near field communication (NFC) reader, or radio frequency (RF) reader, for communicating with devices via a short-range communication protocol. As an example, the short-range communication device 98 may be configured to communicate wirelessly with the sensor controllers 66 using BLE or other short-range communication protocol. As shown by FIG. 5, the monitoring device 80 may comprise a battery 97 for providing electrical power to the electronic components of the device 80. The monitoring device 80 may also comprise an optical device 99, such as a camera or optical scanner, that is configured to read information printed on the label 54 of a device identifier 52. As an example, the optical device 99 may comprise a camera that is configured to capture an image of the label 54 and employ optical character recognition (OCR) or other techniques to read information from the label 54 to identify the control device 18 associated with the label 54. Alternatively, the optical device 99 may comprise an optical scanner is that is configured to scan a bar code, QR code, or other type of information printed on the label 54 to identify the control device 18 associated with the label 54.

In some embodiments, as shown by FIG. 1, the monitoring device 80 is configured to communicate with and control an alarm device 115 that is configured to emit an audible or visual alarm. For example, the alarm device 115 may comprise a light source (not specifically shown), such as one or more light emitting diodes (LEDs), that emits light (e.g., blinks) when an alarm is triggered. The alarm device 115 may comprise a speaker that is configured to emit an audible alarm, such as a siren or prerecorded verbal alarm message. In some embodiments, the alarm device 115 may be positioned in close proximity to the machine 12 so that users close to or working on the machine 12 may receive any alarm generated by the alarm device 115. For example, when the monitoring device 80 determines that a proper procedure for shutting down or restarting the machine 12 has not been followed or otherwise detects a hazardous condition associated with the machine 12, the monitoring device 80 may wirelessly communicate with the alarm device 115 to trigger an alarm in order to warn users near the machine 12.

In some embodiments, the monitoring device 80 may be configured to communicate with a server 122 (FIG. 1) through the network 101 or otherwise. For example, the server 122 may store data 125, referred to herein as "monitoring data," associated with the machine 12 indicating one or more procedures for shutting down or restarting the machine 12. In this regard, the monitoring data 125 may specify a sequence of steps to perform for a procedure to shut down or restart the machine 12. The mobile monitoring device 80 may download the monitoring data 125 and use such data 125 (e.g., display such data 125 to a user) to facilitate a procedure to shut down or restart the machine 12 and ensure that the procedure is appropriately followed by a user of the monitoring device 80, as will be described in more detail below.

Note that monitoring data 125 may be provided to the monitoring device 80 without the use of a network 101 and/or server 122. As an example, the server 122 may be located at the site of the monitoring device 80 and industrial machine 12 such that the monitoring device 80 may communicate directly with the server 122 without the use of a network 101. Alternatively, the monitoring data 80 may be downloaded or otherwise input by a user such that communication with an external server 122 is unnecessary. In other embodiments, yet other techniques for defining and accessing the monitoring data 125 are possible.

In some embodiments, the monitoring data 125 may include additional information to assist a user who is performing the specified procedure. For example, for each step of the procedure, the monitoring data 125 may include a textual description of the step to be performed. As a further example, if the step involves a control device 18 being transitioned to a specific state, such as a valve 23, 24 or switch 22 being transitioned to an opened state or a closed state, the textual description may instruct the user to transition the control device 18 to the specific state.

As an example, assume that a user of the mobile monitoring device 80 desires to perform maintenance on the machine 12 that requires the machine 12 to be shut down before the maintenance operation is to commence. For illustrative purposes, assume that the desired shutdown procedure requires the following sequential steps before maintenance is to commence: (1) the valve 24 is to be transitioned to a closed state, (2) the switch 22 is to be transitioned to an opened state (where handle 46 is moved to the opened position shown by FIGS. 2), and (3) the valve 23 is to be transitioned to a closed state. In other embodiments, other steps and/or sequence of steps may be used.

To initiate the shutdown procedure, a user (e.g., a technician who is to perform the maintenance operation) of the monitoring device 80 may provide information indicative of the procedure to be performed. As an example, using the input interface 91 (FIG. 5) or otherwise, the user may submit inputs that identify the maintenance operation to be performed or that indicates a shutdown operation is to be performed on the machine 12. The user may also provide an input that identifies the machine 12 (e.g., a machine identifier, such as a serial number, and/or a site identifier that identifies the site of the machine 12). Note that the machine 12 may be associated with a machine identifier (e.g., serial number) that is printed on a label (not shown) that can be optically read by the optical device 99 (FIG. 5) or that can be wirelessly transmitted to the monitoring device 80 using a short-range protocol, such as Bluetooth or NFC.

Upon receiving such information, the monitoring logic 82 (FIG. 5) is configured to transmit the information to the server 122 (FIG. 1), which then uses the information to lookup or otherwise retrieve the appropriate monitoring data 125 indicative of the procedure to be performed (e.g., the appropriate shutdown procedure to be used for the machine 12). The server 122 may then transmit such monitoring data 125 to the monitoring device 80, which then uses this data 125 to guide the user through the procedure and to monitor performance of the procedure, as will be described in more detail below.

In the current example, the first step of the shutdown procedure is to transition the valve 24 to a closed state. The monitoring logic 82 is configured to display a graphical user interface (GUI) on the output interface 93 or otherwise provide outputs indicative of the first step of the shutdown procedure. As an example, the monitoring logic 82 may display textual data that defines instructions for instructing the user to transition the valve 24 to a closed state. Such instructions may include information indicative of the location of the valve 24 at the site. In this regard, various locations at the site may be coded with identifiers (e.g., an aisle number, a room number, or an area number) that identifies the location of the valve 24 and/or the machine 12 to which it is connected. In some embodiments, the monitoring data 125 may define a map of the site and such map may be displayed to the user. In addition, the location of the valve 24 may be indicated on the map to help the user to find the valve 24 to be manipulated. In other embodiments, other information for assisting the user to find the valve 24 may be displayed or otherwise rendered to the user.

In some embodiments, as shown by FIG. 1, the monitoring data 125 may include images 127 that can be used to help the user to find and/or appropriately manipulate the control devices 18 according to the procedure being performed. As an example, at least one of the images 127 may be an image (e.g., a digital photograph or drawing) of the valve 24 to be manipulated. In some cases, the digital photograph may be of the actual valve 24 so that the valve 24, as well as surrounding components or devices, are visible in the displayed image thereby helping the user to locate and/or identify the valve 24. In other embodiments, the displayed image may define a photograph or drawing of a valve (not shown) similar to (e.g., same make and model) the valve 24.

When the user believes that he or she has located the valve 24, the user may provide an input via the input interface 91 (FIG. 4) or otherwise to indicate that the control device 18 for the current step has been found. In response, the monitoring logic 82 may take steps to ensure that the user has located the correct control device 18 (e.g., valve 24 in this example) to be manipulated. As an example, the monitoring data 125 may include information indicative of the location of the valve 24, and the monitoring logic 82 may compare the location of the device 80 and, thus, the user holding the device 80 to the indicated location of the valve 24 to confirm whether the user is actually at or close to the location of the valve 24. Note that there are various techniques that can be used to determine the user's location.

For example, as shown by FIG. 5, the monitoring device 80 may have a location sensor 134 that is configured to sense the location of the device 80. In some embodiments, the location sensor 134 may be a global positioning system (GPS) sensor though other types of location sensors may be used. As an example, the location sensor 134 may comprise a radio frequency (RF) transceiver that is configured to communicate with a local RF network at the site to determine the device's location. Yet other techniques for determining the location of the device 80 are possible in other embodiments.

In some embodiments, the monitoring logic 80 confirms that the user is at the location of the valve 24 based on the device identifier 52 that is associated with the valve 24. As an example, when the user believes that he or she has located the correct valve 24, the user may provide information from the associated device identifier 52, which can be used to confirm that the correct valve 24 has been located. For example, the user may use the optical device 99 (FIG. 5) to scan or otherwise read the device identifier 52, or the user may manually input the device identifier 52 via the input interface 91. Alternatively, the device identifier 52 may be prestored in the sensor controller 69 or other device capable of communicating with the monitoring device 80 and be wirelessly transmitted to the monitoring device 80. As an example, the device identifier 52 may be transmitted via BLE or other short-range protocol to the short-range communication device 98 (FIG. 5) of the monitoring device 80.

In response to the device identifier 52, the monitoring logic 82 is configured to compare the device identifier 52 read or otherwise input to the monitoring device 80 and a device identifier for the valve 24 from the monitoring data 125 to confirm that they match. If not, the monitoring logic 82 may display or otherwise render information to the user indicating that the correct valve 24 has not been located. The monitoring logic 82 may also display or otherwise render information that may be helpful in finding the correct valve 24, such as providing information indicating the location of the valve 24, instructions on how to proceed to the location of valve 24, information indicating the location of the correct valve 24 relative to the user's current location (i.e., the location of the control device 18 at which the user is currently present), or one or more images of the correct valve 24. However, if the monitoring logic 82 instead confirms that the correct valve 24 has been located, the monitoring logic 82 continues with the shutdown procedure, as described in more detail below.

In some embodiments, the monitoring logic 82 is configured to display or otherwise render instructions to the user for instructing him or her on how to manipulate the located valve 24. For example, the monitoring logic 82 may display textual instructions indicating how the valve 24 is to be manipulated to place it in the appropriate state (i.e., a closed state in the current example). As an example, the information may instruct the user to turn an actuator (not shown) of the valve 24 to a particular position. To assist the user with this step, the monitoring logic 82 may be configured to display an image of the valve 24 with the actuator appropriately positioned for the desired state. Thus, the user can compare the image to the valve 24 to determine how it is to be manipulated and to confirm that the valve 24 has been appropriately manipulated once the user has provided the appropriate input (e.g., turned the valve's actuator to the appropriate position).

Once the user believes that he or she has transitioned the valve 24 to the appropriate state, the user may provide an input via the input interface 91 (FIG. 5) or otherwise to indicate that the current step has been completed. In response, the monitoring logic 82 may mark the current step as completed and then proceed to the next step of the shutdown procedure by displaying or otherwise rendering information about the next step to the user, as described above in the context of the valve 24. However, in some embodiments, the monitoring logic 82 is configured to automatically confirm that the current step as been appropriately completed before moving to the next step. There are various techniques that may be used by the monitoring logic 82 to confirm completion of the current step (i.e., transition of the valve 24 to the closed state in the current example). In some embodiments, the monitoring logic 82 is configured to use information from the sensor 66 that is monitoring the valve 24. For example, information from the sensor 66 may be used to confirm that the valve 24 has been transitioned to the appropriate state.

As an example, the sensor 66 may be positioned on the actuator (not specifically shown), e.g., a handle, to be turned or otherwise moved to place the valve 24 in the closed state. Based on the sensor data from the sensor 66, the sensor controller 69 may determine when the sensor 66 has sensed the correct movements indicating that the valve 66 has been transitioned to a new state. When a new state is detected, the sensor controller 69 may be configured to transmit information indicative of the new state to the monitoring device 80, noting that such communication may be wireless according to BLE or other short-range protocol. Based on the information from the sensor controller 69, the monitoring logic 82 may confirm that the actuator has, in fact, been moved to the appropriate position for transitioning the valve 24 to the correct state.

Note that to help conserve the power resources (e.g., battery) of the sensor controller 69, the sensor controller 69 may be configured to remain in the sleep state for extended periods of time and to awaken in response to movement sensed by the sensor 66. By conserving power in this manner, the useful life of the power resources may be extended for long periods of time, such as several years.

Once the monitoring logic 82 has confirmed that the first step of closing the valve 24 has been successfully performed, the monitoring logic 82 may display or otherwise render information on the next step of the shutdown procedure. In the current example, the next step is to transition the lever switch 22 in the MCC room to an opened position by throwing or otherwise moving the handle 46 of the switch 22 to the opened position shown by FIG. 3. Thus, based on the instructions and information provided by the monitoring device 80, the user may proceed to the MMC room to manipulate the switch 22 for the next step of the shutdown procedure.

As noted above, the monitoring logic 82 may assist the user with finding the correct switch 22 and manipulating the switch 22. For example, the monitoring logic 82 may display an image showing the handle 46 in the closed position as depicted by FIG. 4 and another image showing the handle 46 in the opened position as depicted by FIG. 3. Thus, seeing the images, the user can discern what position the handle 46 should be in prior the second step of the shutdown procedure and what position the handle 46 should be in after performing the second step of the shutdown procedure. Further, the monitoring logic 82 may provide textual instructions or other types of instructions for instructing the user to move the handle 46 from the position shown by FIG. 4 to the position shown by FIG. 3. The monitoring logic 82 may also display a video showing the handle 46, an animation of the handle 46, or a similar looking handle moving from one position to another to illustrate how the handle 46 is to be moved by the user. Receiving instructions from the monitoring device 80 and also seeing the states of the handle 46 via the displayed images may help the user to find the appropriate handle 46 to be controlled and also understand how the handle 46 is to be moved in order to successfully complete the step.

As indicated above for the first step, the user may provide inputs indicating when he or she arrives at the switch 22 for completion of the second step and has manipulated the switch 22 as instructed. Using the same techniques described above for the first step, the monitoring logic 82 may confirm that the user is at the correct switch 22, is manipulating the correct switch 22 (e.g., based on movement sensed by the sensor 66 connected to the switch 22), and has performed the transition of the switch 22 in the correct manner (e.g., based on movement sensed by the sensor 66 connected to the switch 22).

As an example, the sensor 66 may be implemented as an accelerometer, tilt sensor, or other type of sensor that is mounted on the handle 46 for sensing motion and/or orientation of the handle 46. When the user moves the handle 46 to transition it from the closed position shown by FIG. 4 to the opened position shown by FIG. 3, the sensor 66 mounted on the handle 46 may sense accelerations or changes in orientation that cause the sensor controller 69 for the switch 22 to awaken. Based on the sensor data from the sensor 66, the sensor controller 69 may determine that the handle 46 has been moved to the opened position, and wirelessly transmit a message to the monitoring device 80 indicating that the handle 46 has been moved to the opened position. Such message may also include an identifier of the switch 22 that has been manipulated so that the monitoring device 80 can confirm that the correct switch 22 has been manipulated. Based on such information, the monitoring logic 82 may confirm that the second step of the shutdown procedure has been successfully completed and then proceed to third step of the shutdown procedure.

In the instant example, the next step of the shutdown procedure is to transition the valve 23 to the closed state. The monitoring logic 82 may guide the user through this next step as described above for either of the previous steps. Once the last step of the procedure is determined to be successfully completed, the monitoring logic 82 may display or otherwise render a message indicating to the user that the shutdown procedure has been successfully completed and that maintenance on the machine 12 can be safely started.

At any point in the process, the monitoring logic 82 can detect an anomaly in the shutdown procedure and take additional steps to correct the anomaly or mitigate hazardous conditions that may be caused by the anomaly. As an example, if a user performs an incorrect step (e.g., manipulates the wrong control device 18 for a given step of the procedure or executes the steps of the procedure out of the proper sequence), the monitoring logic 82 detects the anomaly and may display or otherwise render an alarm via the output interface 93 or otherwise indicating that the anomaly has occurred.

Further, the information provided by the monitoring logic 82 may provide additional information about the anomaly, such as steps to be performed to correct the anomaly or information indicative of hazardous conditions that may result from the anomaly. In this regard, such additional information may be predefined and stored as part of the monitoring data 125. When an anomaly is detected, the monitoring logic 82 may be configured to access the monitoring data 125 to look up the information to be displayed or otherwise rendered to the user.

As an example, assume that in the embodiment described above the user omits the second step of transitioning the switch 22 of the bucket 33 to the opened state and incorrectly performs the third step of transitioning the valve 23 to the closed state out of order. In response, the monitoring logic 82 may be configured to instruct the user to transition the valve 23 back to the opened state and, after confirming that the valve 23 has been so transitioned, instruct the user to then perform the second step by transitioning the handle 46 of the switch 22 to the opened state. Thereafter, the shutdown procedure may continue from the second step, assuming that the anomaly has not otherwise resulted in a condition that may necessitate the performance of other intervening steps. In other embodiments, other remedial steps for correcting an anomaly in the procedure are possible.

In some cases, an anomaly may result in a hazardous condition for which it may be desirable to warn one or more users, including in particular users in close proximity to the machine 12. For such a case, as noted above, the monitoring logic 82 may be configured to provide information about the hazardous condition, such as information indicating the type of hazard, how long the hazard may exist, events that may result from the hazard, and/or the equipment associated with the hazard. In some cases, the monitoring logic 82 may be configured to trigger one or more alarms to warn other users of the hazardous condition.

For example, the monitoring logic 82 may be configured to transmit a command to the alarm device 115 for causing the device 115 to emit an alarm, such as a visual or audio alarm. Thus, users in close proximity to the alarm device 115 may receive a warning that a hazardous condition may be present and take appropriate action to prevent harm from the hazardous condition, such as ceasing work on the machine 12 and/or vacating the premises of the machine 12. As noted above, the alarm device 115 may be positioned close to the machine 12 so that users working on the machine 12 or otherwise in close proximity to the machine 12 may receive (e.g., see or hear) the alarm. In some embodiments, the emitted alarm may include a prerecorded verbal message providing instructions on actions to be performed, such as leaving the area of the machine 12.

Once the shutdown procedure has been successfully performed, the monitoring device 80, as described above, may provide an output indicating the successful completion of the shutdown procedure. At this point, a maintenance operation may be safely performed on the machine 12. Once such operation is completed, similar techniques as described above for shutting down the machine 12 may be used to restart the machine 12. Thus, the monitoring device 80 may be similarly used to guide user through the restart procedure and also to ensure that the restart procedure is properly performed in the correct sequence of steps. Similar techniques may be used to assist users with other types of procedures related to the machine 12 in other embodiments.

As illustrated above, the use of a monitoring device 80 that can be carried by a user performing a procedure to control a state of an industrial machine facilitates proper implementation of the procedure in a variety of ways. As an example, the device 80 conveniently provides instructions and other information that helps to guide the user through the procedure, thereby minimizing errors that could damage the machine or result in hazardous conditions. Also, the monitoring device 80 presents the user with information that helps the user to find the control devices 18 in the correct sequence, and the monitoring device 80 is capable of automatically confirming that the procedure is being correctly followed and the control devices 18 are being correctly manipulated according to the procedure.

Note that there are various changes and modifications that can be made to the exemplary embodiments described above. As an example, it is possible for one or more of the steps of a given procedure to be automatically performed rather than relying on a user to manually manipulate a control device 18. For example, at least some control devices 18 may have actuators that are connected to motors or other equipment that can automatically move the actuators to change the state of the control device 18 as may be desired. In such an embodiment, the monitoring logic 82 may be configured to wirelessly communicate with and control the motor to change the state of a control device 18 according to the procedure being implemented.

Various embodiments have been described above as implementing a shutdown procedure for an industrial machine. However, it should be emphasized that the same or similar techniques may be used to facilitate other types of procedures, such as a startup procedure for an industrial machine.

In addition, it should be noted that there are various techniques that may be used to generate portions of the monitoring data 125 that is used by the monitoring logic 82 to monitor and verify the startup and shutdown procedures described herein. As an example, the monitoring data 125 can be manually defined and stored at the server 122 or the monitoring device 80 by a user. In other embodiments, the monitoring logic 82 can be configured to automatically learn the steps for appropriately starting up or shutting down the industrial machine 12.

For example, prior to operation in a mode, referred to hereafter as "monitoring mode," in which the monitoring logic 82 monitors and verifies procedures for starting up or shutting down the industrial machine 12, the monitoring logic 82 may operate in another mode, referred to hereafter as "learning mode," in which the monitoring logic 82 learns the steps of the appropriate procedure for starting up or shutting down the industrial machine 12. In this regard, while the monitoring logic 82 is operating in the learning mode, a user may generally use the monitoring device 80 as he or she normally would in the monitoring mode, as described above, to implement a startup or shutdown procedure. However, while in the learning mode, the monitoring logic 82 may be configured to track the user's actions and store information indicative of the steps performed by the user.

As an example, if a step is to transition the switch 22 of the bucket 33 to a closed position, the monitoring logic 82, through communication with the sensor package 70 coupled to the switch's handle 46, may detect when the handle 46 is thrown in order to transition the switch 22 to the closed state. By tracking the user's location, the monitoring logic 82 may also determine that the user is at the bucket 33 when the handle 46 is thrown to confirm that the detected state transition of the switch 22 is associated with the procedure being performed for the learning mode and thus add the detected transition to the procedure being defined. The monitoring logic 82 may similarly detect other steps performed by the user during the procedure in the learning mode to generate a list of steps that should be performed in the monitoring mode, and the monitoring logic 82 may later use the generated list of steps in the monitoring mode to monitor and verify the same procedure according to the techniques described above.

In other embodiments, machine learning may be used to train the monitoring logic 82 to learn the steps to be performed and/or other portions of the monitoring data 125. As an example, supervisory machine learning (or some other form of artificial intelligence (AI) training) may be used to train an μl model of the monitoring logic 82 on how a component of the system, such as a switch 22 or valve 23, should look when it has been set to the appropriate position for a given step of a procedure being performed. The monitoring logic 82 may then analyze an image of the component (e.g., a switch 22 or valve 23) taken after the user believes he or she as correctly manipulated the component to confirm whether the component indeed has been correctly manipulated according to the step being performed.

In other embodiments, one or more large language models, such as ChatGPT, may be used to analyze an instruction manual for the industrial machine 12 specifying a startup or shutdown procedure recommended by the machine's manufacturer. Such large language models may be trained to extract the appropriate steps to be performed and define the monitoring data 125 accordingly so that the monitoring logic 82, using the monitoring data 125, may inform the user of the appropriate steps and verify that the appropriate steps have been performed, as described above. In yet other embodiments, other techniques for automatically learning and/or otherwise defining the monitoring data 125 are possible.

The invention claimed is:

1. A system for monitoring and verification of shutdown or startup procedures for industrial machinery, comprising:
- an industrial machine;
- a Motor Control Center (MCC) bucket having a switch electrically coupled to the industrial machine for controlling a flow of current from a power source to the industrial machine;
- a plurality of control devices associated with the industrial machine, each of the control devices for controlling a respective flow of a fluid or current to the industrial machine;
- a plurality of sensors configured to detect states of the plurality of control devices; and
- a mobile monitoring device having at least one processor programmed with instructions, that when executed by the at least one processor, cause the at least one processor to:
  - receive wireless signals from sensor controllers coupled to the plurality of sensors, the wireless signals carrying information indicative of the detected states of the plurality of control devices;
  - provide, to a user, information indicative of a shutdown or startup procedure for the industrial machine;
  - based on the information of the detected states carried by the wireless signals, detect changes to the states of the plurality of control devices;
  - determine whether the changes to the states of the plurality of the control devices are consistent with the shutdown or startup procedure; and
  - based on whether the changes to the states of the control devices are consistent with the shutdown or startup procedure, provide to the user information indicating whether a change to a state of the switch is permitted or instructing the user to change the state of the switch.

2. The system of claim 1, further comprising a first sensor mounted on the switch, wherein the first sensor is configured to detect the change in the state of the switch based on the first sensor.

3. The system of claim 2, wherein the instructions, when executed by the at least one processor, cause the at least one processor to trigger an alarm in response to the change in the state of the switch if the change in the state of the switch is determined to be inconsistent with the shutdown or startup procedure.

4. The system of claim 1, wherein the plurality of control devices includes at least one valve.

5. The system of claim 1, wherein the instructions, when executed by the at least one processor, cause the at least one processor to trigger an alarm in response to a determination that the changes to the states of the plurality of the control devices are inconsistent with the shutdown or startup procedure.

6. The system of claim 1, wherein the instructions, when executed by the at least one processor, cause the at least one processor to detect a device identifier associated with one of the plurality of control devices and determine whether the one of the plurality of control devices has been transitioned to a state consistent with the shutdown or startup procedure based on the device identifier.

7. The system of claim 6, wherein the instructions, when executed by the at least one processor, cause the at least one processor to receive the device identifier from a wireless signal transmitted to the mobile monitoring device.

8. The system of claim 6, wherein the instructions, when executed by the at least one processor, cause the at least one processor to read the device identifier from a label.

9. A system for monitoring and verification of shutdown or startup procedures for industrial machinery, comprising:

an industrial machine;

a Motor Control Center (MCC) bucket having a switch electrically coupled to the industrial machine for controlling a flow of current from a power source to the industrial machine;

a plurality of control devices associated with the industrial machine, each of the control devices for controlling a respective flow of a fluid or current to the industrial machine; and a mobile monitoring device having at least one processor programmed with instructions, that when executed by the at least one processor, cause the at least one processor to:

provide, to a user, information indicative of a shutdown or startup procedure for the industrial machine;

automatically monitor steps performed by the user for the shutdown or startup procedure;

determine whether the steps performed by the user are consistent with the shutdown or startup procedure, wherein each of the steps includes manipulation of a respective one of the plurality of the control devices;

based on whether the steps performed by the user are consistent with the shutdown or startup procedure, provide to the user information indicating whether a change to a state of the switch is permitted or instructing the user to change the state of the switch; and trigger an alarm in response to a determination that the steps performed by the user are inconsistent with the shutdown or startup procedure.

10. The system of claim 9, further comprising a first sensor mounted on the switch, wherein the first sensor is configured to detect a change in a state of the switch based on the first sensor.

11. A method for monitoring and verification of shutdown or startup procedures for industrial machinery, comprising:

receiving, with a mobile monitoring device, wireless signals from sensor controllers coupled to a plurality of sensors configured to detect states of a plurality of control devices for controlling flows of fluids or currents to an industrial machine, the wireless signals carrying information indicative of the detected states of the plurality of control devices;

providing, to a user with the mobile monitoring device, information indicative of a shutdown or startup procedure for the industrial machine;

based on the information of the detected states carried by the wireless signals, detecting changes to the states of the plurality of control devices with the mobile monitoring device;

determining, with the mobile monitoring device, whether the changes to the states of the plurality of the control devices are consistent with the shutdown or startup procedure; and based on whether the changes to the states of the control devices are consistent with the shutdown or startup procedure, providing, to the user with the mobile monitoring device, information indicating whether a change is permitted to a state of a switch for a Motor Control Center (MCC) bucket electrically coupled to the industrial machine or instructing the user to change the state of the switch, wherein the switch controls a flow of current from a power source to the industrial machine.

12. The method of claim 11, further comprising detecting, with the mobile monitoring device, the change in the state of the switch based on a first sensor mounted on the switch.

13. The method of claim 12, further comprising triggering an alarm, with the mobile monitoring device, in response to the change in the state of the switch if the change in the state of the switch is determined to be inconsistent with the shutdown or startup procedure.

14. The method of claim 11, wherein the plurality of control devices includes at least one valve.

15. The method of claim 11, further comprising triggering an alarm, with the mobile monitoring device, in response to a determination that the changes to the states of the plurality of the control devices are inconsistent with the shutdown or startup procedure.

16. The method of claim 11, further comprising:

detecting, with the mobile monitoring device, a device identifier associated with one of the plurality of control devices; and determining, with the mobile monitoring device, whether the one of the plurality of control devices has been transitioned to a state consistent with the shutdown or startup procedure based on the device identifier.

17. The method of claim 16, further comprising receiving, with the mobile monitoring device, the device identifier from a wireless signal.

18. The method of claim 16, further comprising reading the device identifier from a label with the mobile monitoring device.

19. A method for monitoring and verification of shutdown or startup procedures for industrial machinery, comprising:

providing, to a user with a mobile monitoring device, information indicative of a shutdown or startup procedure for an industrial machine;

automatically monitoring, with the mobile monitoring device, steps performed by the user for the shutdown or startup procedure, wherein each of the steps includes manipulation of a respective one of a plurality of control devices for controlling flows of fluids or currents to the industrial machine;

determining, with the mobile monitoring device, whether the steps performed by the user are consistent with the shutdown or startup procedure;

based on whether the steps performed by the user are consistent with the shutdown or startup procedure, providing, to the user with the mobile monitoring device, information indicating whether a change is permitted to a state of a switch for a Motor Control Center (MCC) bucket electrically coupled to the industrial machine or instructing the user to change the state of the switch, wherein the switch controls a flow of current from a power source to the industrial machine; and triggering, with the mobile monitoring device, an alarm in response to a determination that the steps performed by the user are inconsistent with the shutdown or startup procedure.

20. The method of claim 19, further comprising detecting, with the mobile monitoring device, the change in the state of the switch based on a first sensor mounted on the switch.

* * * * *